(12) United States Patent
Chu et al.

(10) Patent No.: US 6,791,778 B2
(45) Date of Patent: Sep. 14, 2004

(54) METHOD AND APPARATUS TO DETECT AND MANAGE SERVO SECTORS WITH DEFECT ON SERVO PATTERN AREA IN HARD DISK DRIVES

(75) Inventors: Sang Hoon Chu, Santa Clara, CA (US); Jun Seok Shim, Cupertino, CA (US); Seong Hwon Yu, San Jose, CA (US); Soo Il Choi, Santa Clara, CA (US)

(73) Assignee: Samsung Electronics Co., Inc. (KR)

( * ) Notice: Subject to any disclaimer, the term of this patent is extended or adjusted under 35 U.S.C. 154(b) by 400 days.

(21) Appl. No.: 09/952,682

(22) Filed: Sep. 13, 2001

(65) Prior Publication Data

US 2002/0048108 A1 Apr. 25, 2002

Related U.S. Application Data

(60) Provisional application No. 60/232,650, filed on Sep. 14, 2000.

(51) Int. Cl.$^7$ ................................................. G11B 5/09
(52) U.S. Cl. ........................ 360/53; 360/75; 360/77.08
(58) Field of Search ............................... 360/53, 77.08, 360/75

(56) References Cited

U.S. PATENT DOCUMENTS

| | | |
|---|---|---|
| 4,539,662 A | 9/1985 | Hatano et al. |
| 4,958,337 A | 9/1990 | Yamanaka et al. |
| 5,036,408 A | 7/1991 | Leis et al. |
| 5,255,136 A | 10/1993 | Machado et al. |
| 5,333,140 A | 7/1994 | Moraru et al. |
| 5,442,638 A | 8/1995 | Awad et al. |
| 5,448,429 A | 9/1995 | Cribbs et al. |
| 5,450,249 A | 9/1995 | Nagaraj et al. |
| 5,570,247 A | 10/1996 | Brown et al. |
| 5,581,420 A | 12/1996 | Chainer et al. |
| 5,606,469 A | 2/1997 | Kosugi et al. |
| 5,608,587 A | 3/1997 | Smith |
| 5,610,776 A | 3/1997 | Oh |
| 5,615,058 A | 3/1997 | Chainer et al. |
| 5,659,436 A | 8/1997 | Yarmchuk et al. |
| 5,710,677 A | 1/1998 | Teng et al. |
| 5,754,353 A | 5/1998 | Behrens et al. |
| 5,771,130 A | 6/1998 | Baker |

(List continued on next page.)

FOREIGN PATENT DOCUMENTS

| | | |
|---|---|---|
| EP | 0 426 353 | 10/1990 |
| EP | 0 463 752 | 6/1991 |
| EP | 0 491 563 | 12/1991 |
| EP | 0 582 464 | 8/1993 |
| EP | 0 801 387 | 4/1997 |
| GB | 2 326 755 | 6/1998 |
| WO | WO 93/10494 | 5/1993 |

Primary Examiner—David Hudspeth
Assistant Examiner—Rocio Colon
(74) Attorney, Agent, or Firm—Irell & Manella LLP; Jeffrey P. Aiello

(57) ABSTRACT

An apparatus, method and computer program product for a hard disk drive defect detection system. In one embodiment, a method of detecting defects on the surface of a disk having a plurality of tracks is recited. The method comprises reading, one or more times, the servo bits for a plurality of sectors and determining a burst measure for at least one sector, where the burst measure is a function of the burst signals for the sector. This method further comprises determining a reference value, where the reference value is a function of the burst signals of the plurality of sectors, and comparing the burst measure of at least one sector to the reference value to identify a potential defect. In one embodiment, a sector is mapped as defective where its burst measure differs from the reference value by at least 5 percent.

29 Claims, 5 Drawing Sheets

U.S. PATENT DOCUMENTS

| | | |
|---|---|---|
| 5,781,361 A | 7/1998 | Le et al. |
| 5,798,883 A | 8/1998 | Kim |
| 5,822,139 A | 10/1998 | Ayabe |
| 5,844,911 A | 12/1998 | Schadegg et al. |
| 5,917,670 A | 6/1999 | Scaramuzzo et al. |
| 5,946,157 A | 8/1999 | Codilian et al. |
| 6,151,180 A | 11/2000 | Bang |
| 6,262,859 B1 | 7/2001 | Cho |
| 6,476,997 B2 * | 11/2002 | Fukushima et al. ...... 360/77.08 |
| 6,611,397 B1 * | 8/2003 | Nguyen ................... 360/77.08 |

* cited by examiner

METHOD AND APPARATUS TO DETECT AND MANAGE SERVO SECTORS WITH DEFECT ON SERVO PATTERN AREA IN HARD DISK DRIVES

This application is based on U.S. Provisional application No. 60/232,650, filed on Sep. 14, 2000.

BACKGROUND OF INVENTION

1. Field of Invention

The present disclosure generally relates to disk drives and more particularly to a method and apparatus for detecting defects in a hard drive assembly.

2. Description of Related Art

Disk drives are magnetic recording devices used for the storage of information. The information is typically recorded on concentric tracks on either surface of one or more magnetic recording disks. To facilitate the storage and retrieval of data in an orderly manner, disks are typically organized in blocks called sectors. These sectors are located on the disk by a set of unique identifiers called cylinder (or track), head and sector numbers. The disks are rotatably mounted to a spin motor and information is accessed by means of read/write heads that are mounted to actuator arms. These actuator arms are maneuvered via voice coil motors, wherein the voice coil motor is excited with a current to rotate the actuator and move the heads.

The movement of the actuator is controlled by a servo system. One well known type of servo system is referred to as a dedicated servo, wherein one side of the disk is dedicated to servo information. By using this servo information, the actual radial positions of the heads can be determined, and after comparison with desired head position information, control signals can be sent to the actuator arm to adjust the head position accordingly.

The servo system typically sends control signals to the actuator in accordance with a position error signal (PES) derived from the servo information. Typically, the PES has a magnitude indicative of the relative distance between the head and the center of a track and a polarity indicative of the direction of the head with respect to the track center. Additionally, the PES generally is generated by the servo system by comparing the relative signal strengths of burst signals on the disk surface. It is common during read/write operations to compare the absolute value of each PES sample to a predetermined safe-threshold value in order to verify the correct positioning of the head. It is generally known in the art that there are two situations which may give rise to a PES value which exceeds a safe-threshold value. First, it is possible that the head is misaligned to such an extent that its distance from the center of the track is sufficient to exceed this safe-threshold value. Second, it is likewise possible that a defect exists in the servo information, resulting in a misreported PES value, despite the fact that the head is positioned correctly. This latter scenario is what has led to the practice of using high PES values as an indication that there may be a defect in the servo burst area.

As is generally known in the prior art, using a high PES value to detect servo defects is a cumbersome process. This is due to the fact that the sector with the highest PES value often is not the sector which actually contains the defect. Thus, it is generally considered necessary to check several of the sectors surrounding the high PES sector before labeling any given sector as defective. Moreover, this conventional method for defect detection may also result in mapping continuous sectors as servo defects where a high PES is actually due to an error which occurred during the servo track writing process.

Accordingly, there is a need for an improved approach to detecting servo defects on a disk in a disk drive assembly, such approach avoiding the cumbersome process of taking several PES samples around a defective sector to pinpoint the defective sector.

BRIEF SUMMARY OF INVENTION

The present disclosure comprises an apparatus, method and computer program product for a hard disk drive defect detection system. In one embodiment, a method of detecting potential defects on the surface of a disk having a plurality of tracks is recited. The method comprises reading the servo bits for a first sector and a second sector, determining a burst measure for the first sector, said burst measure being a function of the burst signals provided by the servo bit of the first sector. This method further comprises determining a reference value that is a function of the burst signals of the servo bits for the first sector and second sectors, comparing the burst measure of the first sector to the reference value, and designating said first sector as abnormal where the burst measure of said first sector differs from the reference value by more than a predetermined amount. In one embodiment, the predetermined amount is between 5 percent and 50 percent.

DETAILED DESCRIPTION OF THE INVENTION

In general, the present invention provides a defect detection method utilizing information obtained from a plurality of servo bits to determine if the sector in which these servo bits are located contains a defect. By measuring the amplitude of the servo bit signals for a given sector, it is possible to determine whether the given sector contains a defect by comparing these burst signals to the burst signals of other sectors. The present invention may be used in conjunction with a defect management system such as that disclosed in U.S. application Ser. No. 09/952,683, entitled "SERVO DEFECT MANAGEMENT SCHEME IN HARD DISK DRIVES" filed on Sep. 13, 2001, which has also been assigned to the assignee hereof, and which is hereby fully incorporated by reference.

According to one embodiment of the present invention, the servo bits for each of at least a first and a second sector are read one or more times. A burst measure may then be determined for one or more of the at least first and second sectors, where the burst measure is a function of the burst signals provided by the servo bits for each of at least first and second sectors. A reference value may then be determined, where the reference value is a function of the burst measures for the at least first and second sectors. The burst measure for a given sector is then compared to the reference value. If the difference between the burst measure for a given sector and the reference value exceeds some tolerance, which may be predetermined, the particular sector may be marked as defective.

Figure 1:
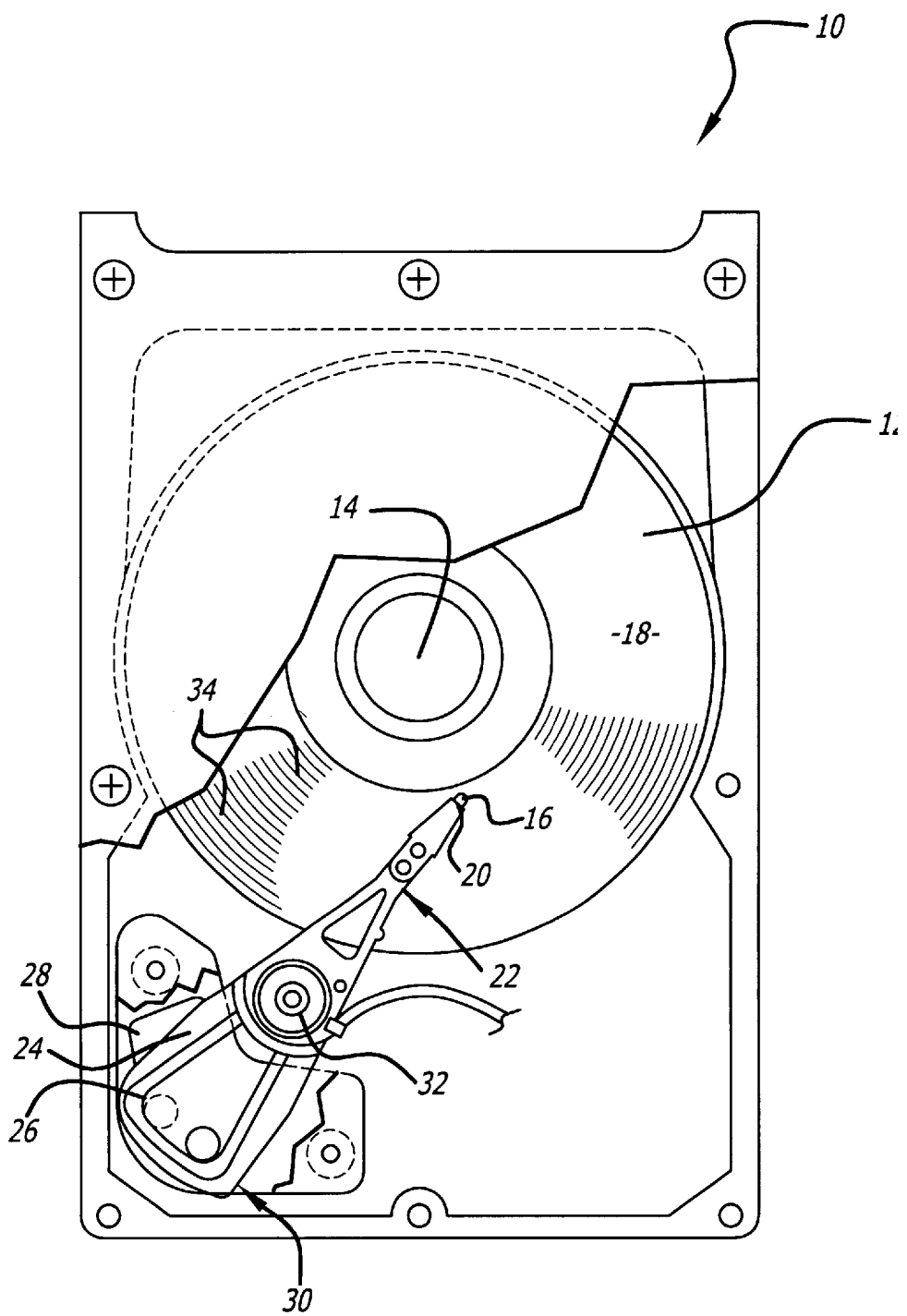
FIG. 1 is a top view of an embodiment of a hard disk drive of the present invention.

Referring to the drawings more particularly by reference numbers, FIG. 1 shows an embodiment of a hard disk drive 10. The drive 10 includes at least one magnetic disk 12 that is rotated by a spindle motor 14. The drive 10 may also include a transducer 16 located adjacent to a disk surface 18.

The transducer 16 can write and read information on the rotating disk 12 by magnetizing and sensing the magnetic field of the disk 12, respectively. There is typically a transducer 16 associated with each disk surface 18. Although a single transducer 16 is shown and described, it is to be understood that there may be a write transducer for magnetizing the disk 12 and a separate read transducer for sensing the magnetic field of the disk 12. The read transducer may be constructed from a magneto-resistive (MR) material. Some heads contain a magneto-resistive (MR) material that is used to sense the magnetic field of the disks. The resistance of the magneto-resistive material will vary linearly with variations in the magnetic field. The magneto-resistive material is coupled to a current source. Variations in the magnetic field of the disk will cause a corresponding change in the magneto-resistive resistance and the voltage sensed across the magneto-resistive element. MR heads typically have a higher bit density than other types of disk drive heads The transducer 16 can be integrated into a slider 20. The slider 20 may be constructed to create an air bearing between the transducer 16 and the disk surface 18. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Providing a current to the voice coil 26 will generate a torque that rotates the actuator arm 24 about a bearing assembly 32. Rotation of the actuator arm 24 will move the transducer 16 across the disk surface 18.

Information is typically stored within annular tracks 34 of the disk 12. Each track 34 typically contains a plurality of sectors. Each sector may include a data field and an identification field. The identification field may contain Gray code information which identifies the sector and track (cylinder). The transducer 16 is moved across the disk surface 18 to write or read information on a different track. Moving the transducer to access a different track is commonly referred to as a seek routine.

Figure 2:
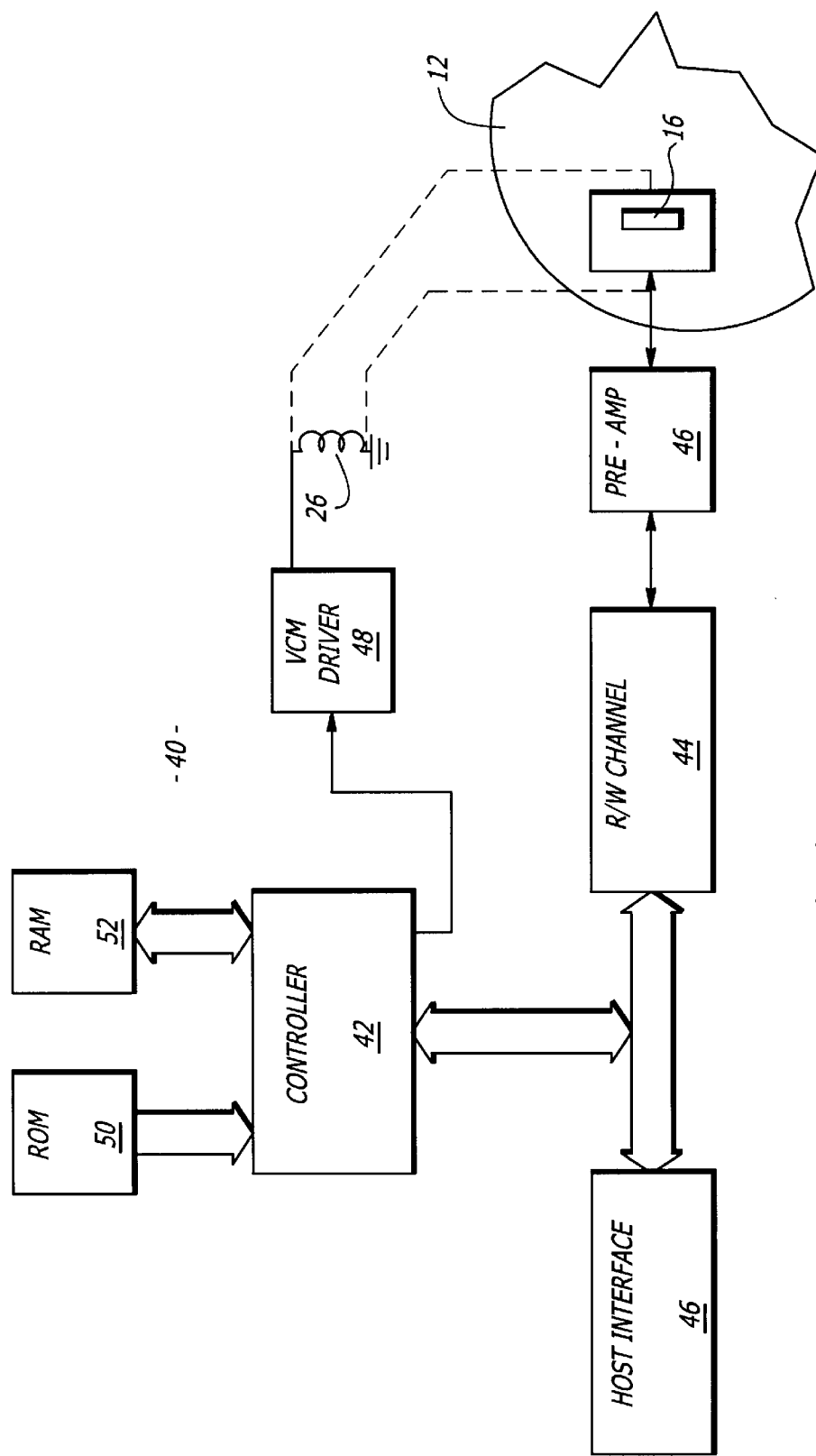
FIG. 2 is a schematic of an electrical system which controls the hard disk drive.

FIG. 2 shows an electrical system 40 which can control the hard disk drive 10. The system 40 may include a controller 42 that is coupled to the transducer 16 by a read/write (R/W) channel circuit 44 and a pre-amplifier circuit 46. The controller 42 may be a digital signal processor (DSP), microprocessor, microcontroller, and the like. The controller 42 can provide control signals to the read/write channel 44 to read from the disk 12 or write information to the disk 12. The information is typically transferred from the R/W channel 44 to a host interface circuit 46. The host circuit 46 may include buffer memory and control circuitry which allow the disk drive to interface with a system such as a personal computer.

The controller 42 may also be coupled to a VCM driver circuit 48 which provides a driving current to the voice coil 26. The controller 42 may provide control signals to the driver circuit 48 to control the excitation of the VCM and the movement of the transducer 16.

The controller 42 may be connected to a non-volatile memory such as a read only memory (ROM) or flash memory device 50, and a random access memory (RAM) device 52. The memory devices 50 and 52 may contain instructions and data that are used by the controller 42 to perform software routines. Alternatively, the instructions and data may be stored on a disk 12. One of the software routines may be a seek routine to move the transducer 16 from one track to another track. The seek routine may include a servo control routine to insure that the transducer 16 moves to the correct track.

Figure 3:
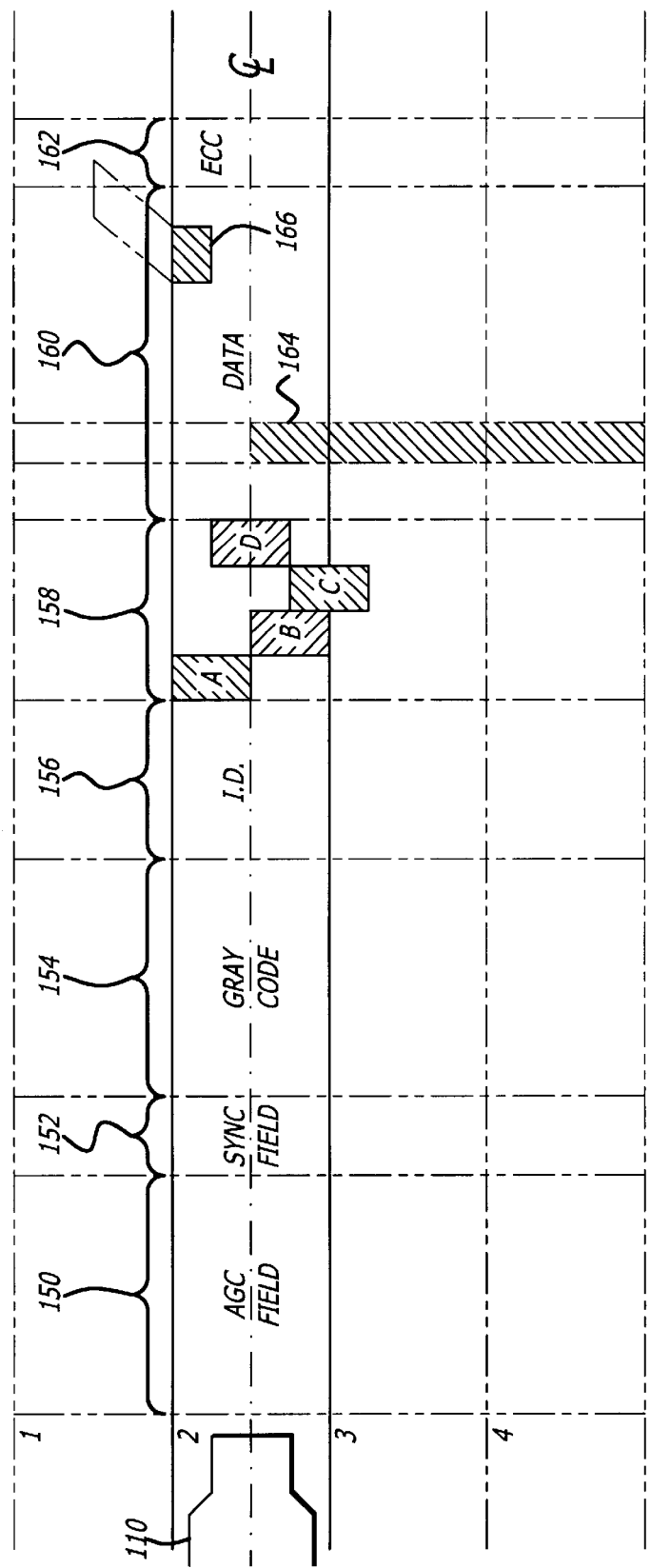
FIG. 3 illustrates the layout of a typical sector of the disk in a hard disk drive.

As shown in FIG. 3, data is typically stored within sectors of radially concentric tracks located across disk 12. A typical sector will have an automatic gain control (AGC) field 150, a synchronization (sync) field 152, a gray code field 154 that identifies the track, an identification (ID) field 156 that defines the sector, a servo field 158 which includes a number of servo bits A, B, C, D, a data field 160 which contains data and an error correction field 162. In operation, the head 110 is moved to a track and the servo information provided in servo field 158 is read and provided to the electrical system 40.

According to one embodiment of the current invention, defects in a given sector, such as defect 164 or 166, are detected by comparing some measure of the magnitude of the burst signals of the servo bits A, B, C, and D for the given sector to some reference value. In one embodiment, this burst signal measure is the sum of the burst signals for the servo bits A, B, C, and D. While summing the burst signals of the servo bit to get the burst signal measure is one embodiment, it should be appreciated that other methods of calculating a burst signal measure may be used. For example, the burst signal measure may be the measure of one of the servo bits or may be the average of the servo bits.

It should further be appreciated that it may be desirable to read the burst signals for a given sector more than once. This may be done, for example, to improve the accuracy of the measured bust signal magnitudes. When more than one reading is taken, according to one embodiment of the present invention, the average burst signal for the given sector or sectors may be obtained by dividing the sum of the burst signals for this given sector or sectors by the number of times those servo bits were read.

Once a burst signal measure is obtained, one aspect of the present invention is to compare it to a reference value to determine if it differs from the reference value by more than a threshold amount. In one embodiment this amount is 30 percent. In other embodiments, this amount may be higher or lower. If the burst signal measure for a particular sector differs from the reference value by more than the threshold amount, the sector may be mapped as defective. In addition to mapping the given sector as defective, the write gate for the defective sector may also be disabled.

In one embodiment, the reference value is a function of the burst signal measures for a representative sample of sectors on the disk. It should be appreciated that this representative sample may be comprised of more than one sector along a single concentric track on a disk, or alternatively, may be comprised of a number of sectors on different tracks on the disk.

Figure 4A:
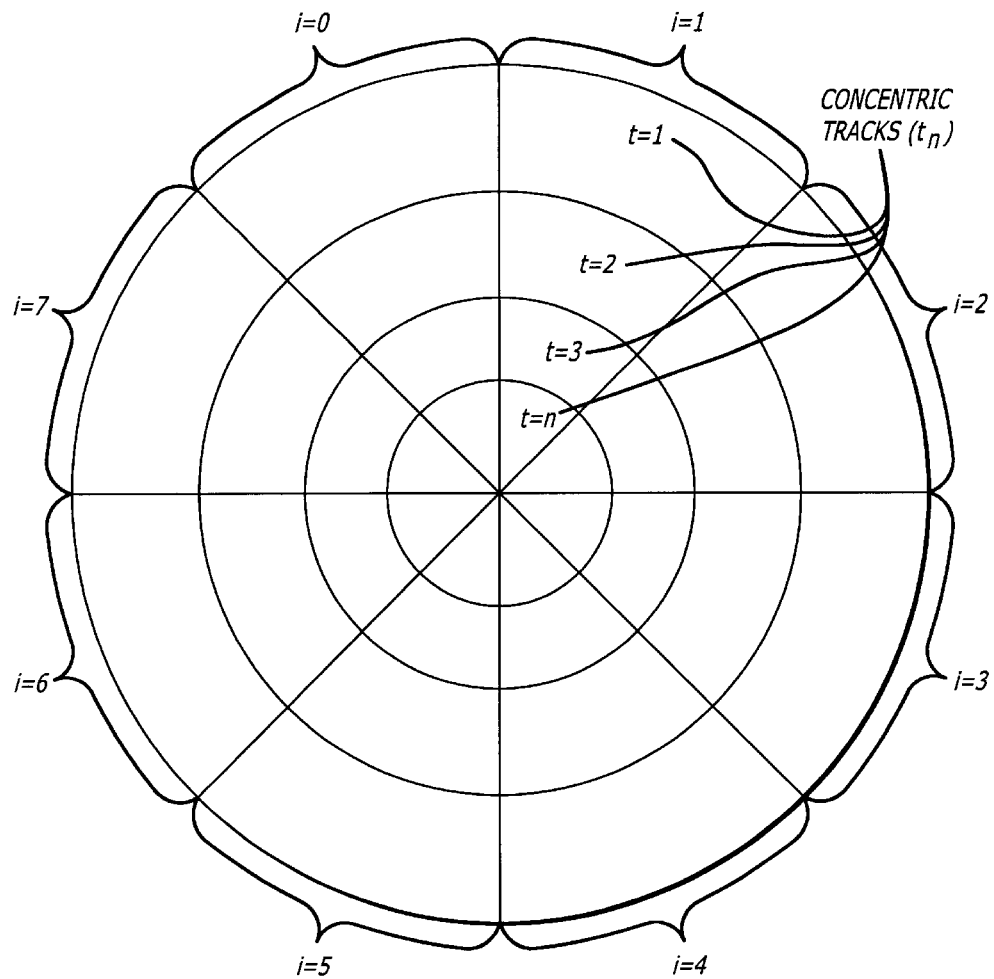
FIG. 4A provides a simplified layout of the surface of a disk.
Figure 4B:
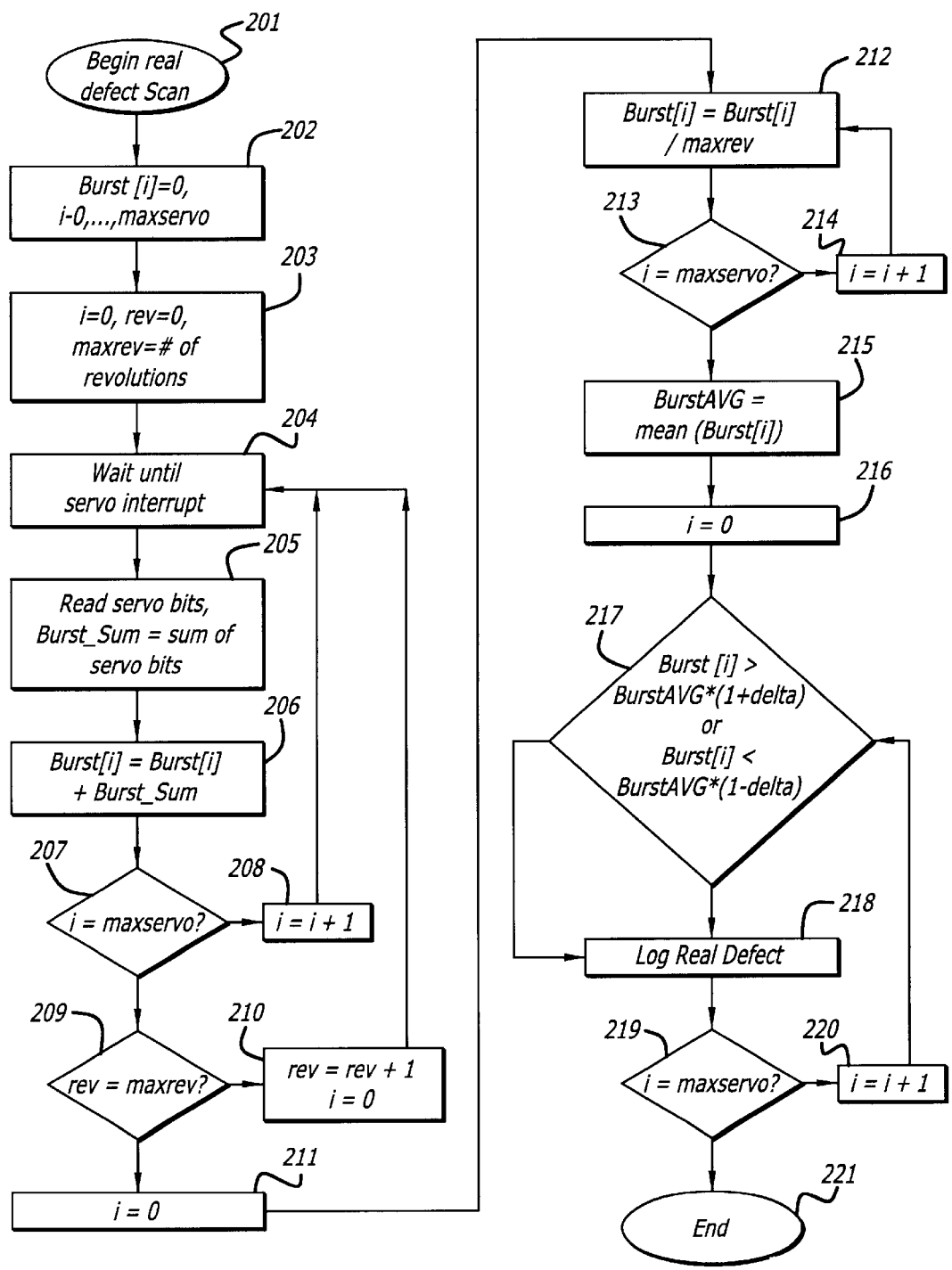
FIG. 4B is a flow diagram of one embodiment of the present invention.

FIG. 4A is an exemplary map of a disk. FIG. 4B illustrates an exemplary process 200 for detecting servo defects, according to one embodiment of the present invention. Referring in particular to FIGS. 4A and 4B, the process 200 commences at block 201 for a given concentric track $t_n$. The process 200 begins by initializing a table of i entries to zero, where the i entries in the table for Burst [i] represent the magnitudes of the servo bit burst signals for a given sector i. In one embodiment there are four burst signals in each servo sector corresponding to the four servo bits. In addition, the variable i ranges from zero to some variable maxservo, where, according to one embodiment, the variable maxservo represents the number of servo sectors in a given concentric track $t_n$ of the disk. By way of a non-limiting example, in FIG. 4A the variable maxservo is set to 7. Thus, in this embodiment each revolution of the disk has the transducer 16 reading eight servo sectors i, with i ranging from 0 to 7. It should be appreciated, however, that the sectors i may be located on different concentric tracks $t_n$ of the disk.

Continuing to refer to FIGS. 4A and 4B, at block 205 the process 200 proceeds with measuring the magnitude of the servo bit burst signals for the sector i. This value is stored in variable Burst_Sum. The value in Burst_Sum is then added to the variable Burst[i] at block 206. Thus, after the first sector is read, Burst[i] will be equal to Burst_Sum since Burst[i] was initially set to zero.

At block 207, the process 200 continues by checking to see if i has reached maxservo. If not, then at block 208 the variable i is increased by 1 and Burst_Sum is read for the next set of servo bits in the next sector (i=1). This loop continues until all sectors have been read for one revolution, or concentric track $t_n$, and values for Burst[$i_{0-7}$] have been obtained. Alternatively, the loop may continue until all the chosen sectors across a plurality of tracks have been read.

At block 209, process 200 determines if rev has reached maxrev, where maxrev is some predetermined number of revolutions. This is, maxrev represents the number of times the burst signals in a sector are read. The burst signals in a sector may be read more than once to validate the magnitude of the burst signals in a given sector. This may help to eliminate potential misreads that may otherwise occur. In one embodiment, maxrev equals 8. If rev is less than maxrev, then process 200 sets i=0 at block 210 and loops back to block 204 for the next revolution. As with the previous revolution, the next revolution determines the magnitude of the servo bit burst signal, Burst_Sum, for each servo sector from i=0 to i=maxservo. The variable Burst[i] represents the cumulative magnitude of the servo bit burst signal for a given sector i through all revolutions completed.

Once this predetermined number of revolutions maxrev has been completed, process 200 sets i=0 and proceeds to block 212 where each entry in the table of Burst[i] is normalized for each sector read by dividing it by the number of revolutions completed, maxrev. Loop 212–214 continues until the variable Burst[i] for each sector has been normalized.

Once each of the magnitudes of the burst signals in the i sector have been normalized, the mean burst signal, BurstAVG, of all sectors i is computed at block 215. Thus, in the current example of FIG. 4A, the burst signals for the eight sector (i=0–7) are added and then divided by eight to yield the BurstAVG. This mean burst signal is then compared to the magnitude of the normalized burst signals for each sector i at block 217. If Burst [i] for sector i differs from BurstAVG by some predetermined amount delta, a servo defect is logged for that sector i (see blocks 216–220). Blocks 217–220 proceeds through all the sectors $i_{0-maxservo}$, each time measuring the difference between the normalized burst signal, Burst[i], for the sector i against the average burst signal, BurstAVG, for all sectors.

It should be appreciated that process 200 can be performed for any number of concentric tracks on a given disk from t=1 to t=n. It should further be appreciated that Burst [i] may be normalized for a given concentric track $t_n$ as described herein, or may be normalized against burst signals in various concentric tracks $t_1$–$t_n$. Similarly, BurstAVG may be the mean for the burst signals in a given concentric track $t_n$, or it may represent the mean for the burst signals across a number of tracks $t_1$–$t_n$.

The present invention may be implemented as a method, apparatus, system, etc. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A hard disk drive, comprising:

a housing;

an actuator arm mounted to said housing;

a head mounted to said actuator arm;

a disk attached to a spin motor said disk having a plurality of tracks, each of said tracks having a first sector and a second sector, each sector having a servo bit, each servo bit provides a burst signal when read by the head; and, a controller coupled to said head to control the reading of the servo bits, said controller to read said servo bits for the first and second sectors, said controller to determine a burst measure for said first sector that is a function of the burst signal of the servo bit for the first sector, said controller to compare said burst measure for said first sector to a reference value to identify a potential defect, said reference value being a function of the burst signals for the first and second sectors.

2. The hard disk drive of claim 1, wherein the controller designates said first sector as abnormal where the burst measure for said first sector differs from the reference value by more than a predetermined amount.

3. The hard disk drive of claim 2, wherein designating said first sector as abnormal comprises mapping the first sector as defective.

4. The hard disk drive of claim 2, wherein said predetermined amount is at least 5 percent.

5. The hard disk drive of claim 1, wherein said controller further determines a burst measure for said second sector that is a function of the burst signal of the servo bit for the second sector, compares said burst measures for each of the first and second sectors to the reference value, determines if said burst measures for each of the first and second sectors differ from the reference value by more than a predetermined amount and if so, designates one or more of the first an second sectors having burst measures differing from the reference value by more than the predetermined amount as abnormal.

6. The hard disk drive of claim 1, wherein said controller reads said servo bit for the first sector a plurality of times and determines the burst measure for the first sector by taking a sum of the burst signals for the plurality of times said first sector is read and dividing said sum by the number of times said first sector is read.

7. The hard disk drive of claim 3, wherein mapping the first sector as defective further comprises disabling write gate for the first sector.

8. The hard disk drive of claim 1, wherein said first sector includes four servo bits.

9. The hard disk drive of claim 1, wherein each of said tracks includes a plurality of sectors, said reference value being a numerical average of the burst measures for the plurality of sectors.

10. The hard disk drive of claim 1, wherein said controller performs a servo routine, said servo routine to include performing a plurality of readings of the servo bits for each of the first and second sectors, taking a sector sum of the burst signals of the servo bits for each of the first sector and second sector over the plurality of readings, taking a mean sector burst signal for said first sector by dividing said sector sum for said first sector by the number of times said first sector is read, determining the reference value by taking a numerical average of the mean sector burst signals for the first sector and second sector, and comparing said mean sector burst signal for the first sector to the reference value.

11. The hard disk drive of claim 10, wherein said servo routine further includes designating said first sector as defective where the mean sector burst signal for the first sector differs from the reference value by more than a predetermined amount.

12. The hard disk drive of claim 1, wherein said first and second sectors are on a plurality of tracks.

13. A method of detecting a defect on a disk having a plurality of tracks, each of said tracks having a first sector and a second sector each sector, having a servo bit, each of said servo bits to provide a burst signal when read, comprising:
    reading the servo bits for each of the first sector and second sector;
    determining a burst measure for the first sector, said burst measure being a function of the burst signals provided by the servo bit of the first sector;
    determining a reference value that is a function of the burst signals of the servo bits for the first sector and second sectors;
    comparing the burst measure of said first sector to the reference value; and,
    designating said first sector as abnormal where the burst measure of said first sector differs from the reference value by more than a predetermined amount.

14. The method of claim 13, where designating said first sector as abnormal comprises, designating said first sector as abnormal where the burst measure of said first sector differs from the reference value by more than the predetermined amount, said predetermined amount is between 5 to 50 percent.

15. The method of claim 13, where designating said first sector as abnormal comprises mapping the first sector as defective.

16. The method of claim 15, further comprising disabling the write gate for said first sector.

17. The method of claim 13, where determining a burst measure for the first sector comprises, determining burst measure for the first sector, said burst measure for the first sector being equal to a sum of the burst signals of the servo bits divided by the number of times said first sector is read, where said first sector includes a plurality of servo bits and said first sector is read a plurality of times.

18. The method of claim 13, wherein determining a reference value, comprises determining a reference value that is a numerical average of the burst measures for the first and second sectors.

19. The method of claim 13, wherein reading the servo bits for each of the first and second sectors, comprises reading said servo bits a plurality of times.

20. The of claim 13, wherein reading the servo bits for each of the first and second sectors comprises, reading the servo bits of the first sector and second sector where said first sector and second sector are located on different tracks.

21. A method of detecting defects on a disk having a plurality of tracks, each of said tracks having at east first and second sectors, each of the at least first and second sectors having one or more servo bits each of said servo bits, capable of producing a burst signal, comprising:
    reading a plurality of times the one or more servo bits for each of the at least first and second sectors;
    determining a mean sector burst signal for each of the at least first and second sectors by taking a sum of the burst signals from the plurality of readings for each of the at least first and second sectors, and dividing, for each of the at least first and second sectors, said sum of the burst signals by the number of times said first and second sectors are read;
    determining a reference value taking a sum of the mean sector burst signals for the at least first and second sectors, then dividing said sum of the mean sector burst signals by the number of said at least first and second sectors;
    comparing said mean sector burst signal for each of the first and second sectors to the reference value; and,
    designating one or more of said at least first and second sectors as abnormal where said mean sector burst signal for said first and second sectors differs from the reference value by more than a predetermined amount.

22. The method of claim 21, wherein designating said at least first and second sectors as defective comprise mapping one or more of said at least first and second sectors as defective and disabling on or more write gates for said at least first and second sectors.

23. A computer program product, comprising:
    a computer usable medium having computer program code embodied therein to read a plurality of sectors of a disk across one or more tracks, each of said sectors having a servo bit, each of said servo bits to provide a burst signal when read;
    computer program code to determine a burst measure for a first sector where said burst measure is a function of the burst signal of the servo bit for the sector;
    computer program code to determine a reference value where said reference value is a function of the burst signals of the servo bits for the plurality of sectors; and,
    computer program code to compare the burst measure for the first sector to the reference value to identify a non-conforming sector.

24. The computer program product of claim 23, further comprising computer program code to designate said first sector as abnormal where the burst measure of said first sector differs from the reference value by more than a predetermined amount.

25. The computer program product of claim 24, wherein to designate said first sector as abnormal comprises mapping said first sector as defective.

26. The computer program product of claim 25, wherein the predetermined amount is at least 5 percent.

27. The computer program product of claim 23, wherein to determine a burst measure for the first sector comprises reading the servo bit for the first sector a plurality of times, taking a sum of the burst signals of the servo bit for the first sector over the plurality of times read and dividing the sum of said burst signals by the number of times said servo bit is read.

28. The computer program product of claim 23, further comprising computer program code to determine a burst measure for each of the plurality of sectors by reading the servo bits for the plurality of sectors one or more times, taking a sum of the burst signals of the servo bits for each of the plurality of sectors over the one or more times read, and dividing the sum of said bust signals for each of said plurality of sectors by the number of times said servo bits are read.

29. The computer program product of claim 23, wherein to determine a reference value comprises taking a sum of the burst measures for the plurality of sectors, and dividing said sum of the burst measures by the number of sectors.

* * * * *